July 14, 1925.

F. M. PETERS

APPARATUS FOR SHEETING DOUGH

Filed Sept. 29, 1922

Inventor.
Frank M. Peters - Deceased,
by Jennie A. Peters - Executrix.

By Fisher Towle Clapp & Sims
Attys

July 14, 1925.

F. M. PETERS 1,545,689

APPARATUS FOR SHEETING DOUGH

Filed Sept. 29, 1922   9 Sheets-Sheet 7

Fig.8

Inventor:
Frank M. Peters - Deceased,
by Jennie A. Peters - Executrix.
By Fisher Towle Clapp Sons
Attys.

July 14, 1925.

F. M. PETERS

APPARATUS FOR SHEETING DOUGH

Filed Sept. 29, 1922

Inventor.
Frank M. Peters- Deceased.
by Jennie A. Peters- Executrix.

Patented July 14, 1925.

1,545,689

UNITED STATES PATENT OFFICE.

FRANK M. PETERS, DECEASED, LATE OF MOUNT KISCO, NEW YORK, BY JENNIE A. PETERS, EXECUTRIX, OF MOUNT KISCO, NEW YORK, ASSIGNOR TO PETERS MACHINERY COMPANY, OF CHICAGO, ILLINOIS, A CORPORATION OF ILLINOIS.

APPARATUS FOR SHEETING DOUGH.

Application filed September 29, 1922. Serial No. 591,208.

*To all whom it may concern:*

Be it known that FRANK M. PETERS, deceased, late a citizen of the United States, residing at Mount Kisco, in the county of Westchester and State of New York, invented certain new and useful Improvements in Apparatus for Sheeting Dough, of which the following is a specification.

The invention relates to improvements in apparatus for sheeting dough and has particular application in connection with a method of and apparatus for sheeting dough such as is disclosed in the U. S. Patent to Frank M. Peters, No. 881,439, for dough sheeting machine, issued March 10th, 1908, or in U. S. Patent to Frank M. Peters and Warren H. Hungerford, No. 1,455,120, dated May 15, 1923, for dough sheeting apparatus.

When dough is sheeted according to a continuous process, such as is described in the patent and application previously referred to, the product of the machine and process in certain cases, for instance, when used for making crackers must be rolled out very thin as an additional or subsequent operation and consequently the sheet dough is used up at a comparatively low rate thus necessitating a comparatively slow speed of delivery from the cross rolling apparatus. Ordinarily such relatively slow movement of the initial or cross rolling apparatus is unobjectionable, but in some instances, for example, in preparing dough for crackers, the final baked product appears to be somewhat more condensed in bulk than is desirable for certain classes of trade.

The bulk of the final product may be increased for a given weight, that is to say, the goods may be made somewhat lighter if the dough be rolled out initially at a considerably greater rate than is demanded by the finishing rolls. Neither the exact reason for this nor the theory upon which this conclusion is based can be stated, but this conclusion has nevertheless been verified by extensive tests and experiments.

The pricipal object of this invention is to provide a process and apparatus for rolling dough initially at a higher rate than it is consumed or used up in the finishing treatment; to provide a process and apparatus in which dough is rolled in two stages, the rate of delivery during the first stage being considerably higher than the rate of delivery in the second stage, while maintaining continuity of the web and thereby securing the advantages of a continuous process; to provide an improved arrangement for storing or taking care of the accumulations of initially rolled dough produced by intermittent relatively high speed operation of the initial rolling apparatus and in such manner that such accumulations of dough are properly supplied or presented to the rolls of the second stage; to provide improved means for maintaining the continuity of the web and for preventing excessive accumulations of dough intermediate the first and second stages of the treatment; to provide an improved arrangement for regulating the output or rate of delivery of the roughing and finishing rolls independently of each other; to provide a construction which shall be simple and economical to design and manufacture and in general to provide an improved and efficient process and apparatus of the character referred to.

In the drawings which illustrate the invention as applied to a machine of the general type disclosed in the Peters patent above referred to, Fig. 1 is a side elevation of the combined apparatus, partly in section.

Figure 1:
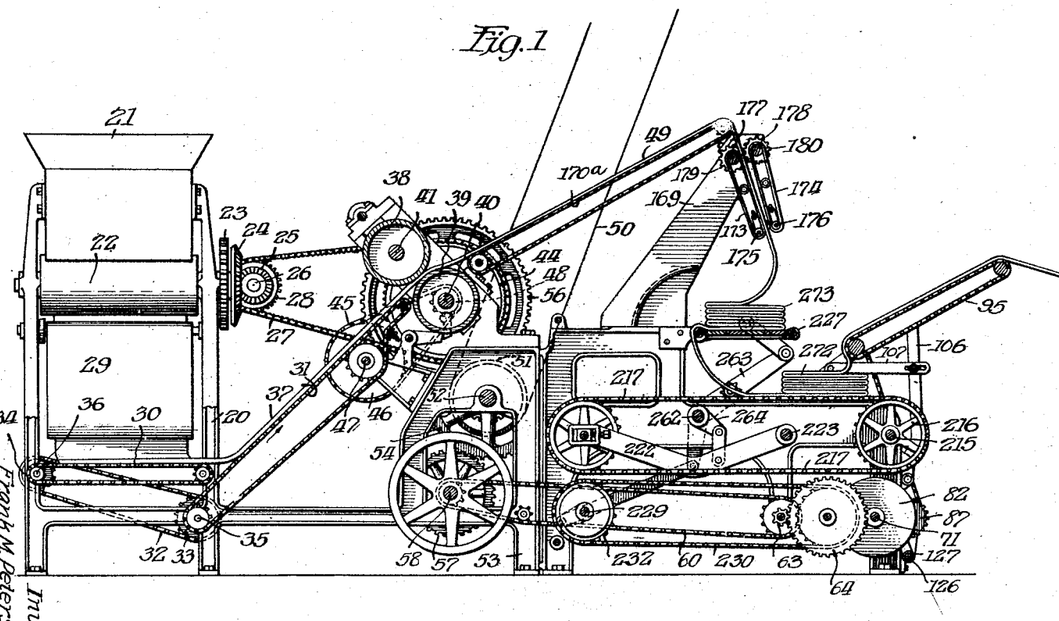

Referring to the drawings, it will be observed that the mechanism shown at the left of Fig. 1 is illustrated more or less diagrammatically in order to indicate apparatus such as is embraced within my previous patent or the pending application heretofore referred to. Such apparatus includes a main frame as at 20, upon which is mounted a dough hopper 21, a pair of roughing rolls, one of which is indicated at 22, driven by spur gears, one of which is indicated at 23, said spur gears being operated through a pair of bevel gears 24 and 25. The bevel gear 25 is keyed to a shaft 26 driven by a chain 27 trained around a sprocket wheel 28 also keyed to the shaft 26.

Distribution of the dough rolled out by the roughing rolls is effected by a pair of swinging belts, one of which is indicated at 29. Said belts may be pivoted as shown in said Peters patent, or as disclosed in the application of Kern and Kaminsky, Serial No. 340,017, and swing from their upper ends, the lower ends serving to lap the sheet of dough in W-fashion on the upper surface of the cross conveyor 30. Said cross conveyor 30 feeds onto an inclined upwardly travelling conveyor 31, which drives the conveyor 30 through a chain 32 trained around sprocket wheels 33 and 34 respectively keyed to shafts 35 and 36 of the conveyor belts 31 and 30. The sheet or web of dough 37 having been lapped in W form by the above described apparatus is conducted between a pair of secondary roughing rolls 38 which are driven by a shaft 40 which constitutes the shaft of the lower roll 39. The other roll shaft is driven by a pair of spur gears 42 and 43 respectively keyed to roll shafts 40 and 41.

The shaft 40 which may be considered the power shaft of the apparatus for treating the dough in the first stage of rolling, also drives the roughing roll and chain 27 through a large sprocket gear 44 also keyed to shaft 40 and in addition thereto drives the conveyor 31 through a chain 45 trained around a sprocket wheel 46 keyed to one of the conveyor shafts 47, the upper end of said chain 45 passing around a smaller sprocket gear 48 keyed to said shaft 40. It will be understood that when the shaft 40 is actuated, the primary roughing rolls, the conveyor elements 30 and 31, the swinging distributor 29 and the secondary roughing rolls 38 and 39 are all operated continuously and simultaneously. Such apparatus which serves to produce the relatively thick continuous web of dough sheet 49 is not intended to be claimed specifically as a part of the present invention, as the apparatus upon which the present invention is based may be used in connection with any desired type of machine for producing a continuous sheet or web of dough intended to be further attenuated by subsequent treatment.

Figure 8:
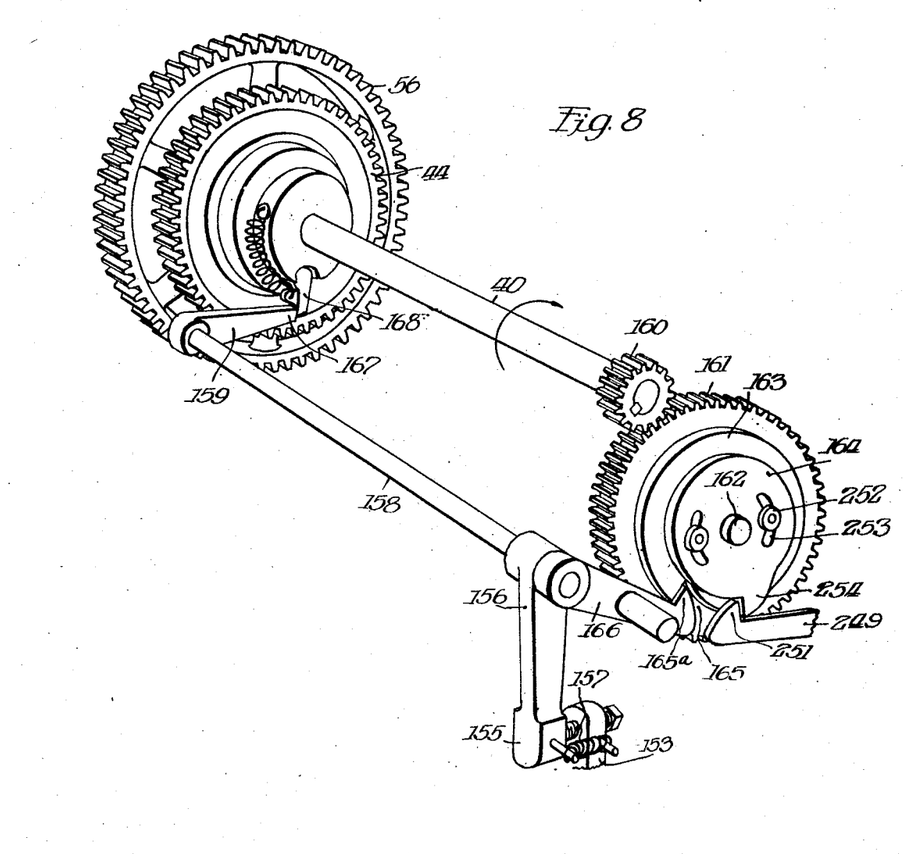
Fig. 8 is a perspective view of certain clutch mechanism.

Still referring to Fig. 1, it will be noted that the machine as a whole is driven by a constantly running belt 50 operated by any suitable source of power, not shown, said belt being trained around a drive pulley 51 keyed to shaft 52 supported in suitable bearings in the main frame 53. On the said shaft 52 there are keyed two spur gears 54 and 55, (see also Fig. 3). The spur gear 55 meshes with a large spur gear 56 normally revolving freely on shaft 40 and adapted to be clutched thereto at appropriate times by a suitable clutch mechanism such as shown in Fig. 8. Said clutch mechanism in its interior details is similar to that illustrated in Figs. 9 and 10 which show a like clutch for driving another portion of the mechanism, later to be described.

Figure 4:
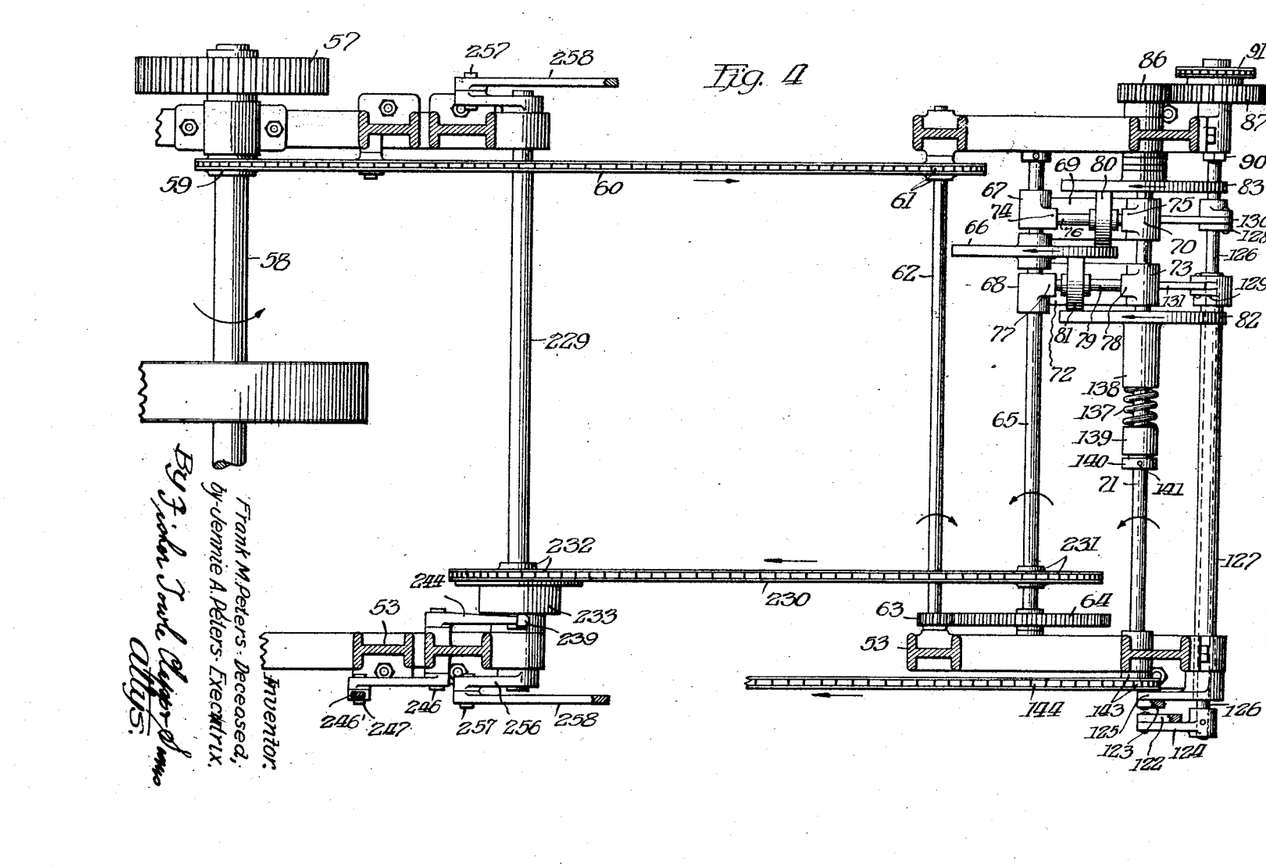
Fig. 4 is a section taken on the line 4—4 of Fig. 2.

The large spur gear 54, which is keyed to the constantly running drive shaft 52 meshes with a spur gear 57 keyed to a horizontal shaft 58; on said shaft 58 there is also keyed a sprocket gear 59 which drives a substantially horizontal sprocket chain 60 (see also Fig. 4). Said sprocket chain 60 is trained around a sprocket wheel 61 keyed to a horizontal shaft 62 on the other end of which shaft there is keyed a spur pinion 63. Spur pinion 63 meshes with a spur gear 64 keyed to a shaft 65 parallel with shaft 62. It will be observed that shafts 52, 58, 62 and 65 revolve continuously.

Still referring to Fig. 4 and also Figs. 11 to 14 inclusive, there is slidably keyed to the constantly running shaft 65 a friction disc 66 revolving between substantial bearings 67 and 68 which prevent shaft 65 from being distorted by pressure applied to either side of the friction disc 66. The bearing block 67 is connected by means of an integral bar 69 with a somewhat similar bearing block 70 in which revolves a shaft 71 parallel with shaft 65. Similarly the bearing block 68 is connected by means of a bar 72 with a somewhat similar bearing block 73 in which also revolves said shaft 71. The adjacent sides of the bearing block 67 and 70 are provided with bored lugs as at 74 and 75 to accommodate a transverse shaft 76. Similarly, bearing blocks 68 and 73 are made with integral lugs 77 and 78 bored out to accommodate a transverse shaft 79. The shafts 76 and 79 need not revolve in their respective bearings, as they merely form supports on which slide and rotate the friction pulleys 80 and 81.

The friction pulley 81 serves as a speed varying device for transferring rotary movement from disc 66 to the disc 82 which is keyed but slidable on shaft 71. Similarly, the friction pulley 80 drives a similar disc 83 which is loose or rotatable on shaft 71 but is made integral with a sleeve 84 (see Fig. 14) within which shaft 71 revolves, and which rotates freely in bearing 85. On the end of said sleeve 84 there is keyed a spur pinion 86 which drives a spur gear 87 which revolves on a pin 88 secured in boss 89 by means of a nut 90. Bolted or otherwise secured to the spur gear 87 there is a sprocket pinion 91 (see also Fig. 3) around which there is trained a drive chain 92. The drive chain 92 passes around a sprocket gear 93 keyed to the lower shaft 94 of the conveyor belt 95, said conveyor belt 95 being adjustably located for feeding the final set of finishing rolls 96 and 97. Said finishing rolls 96 and 97 are driven by a constantly running belt 98 which passes around a pulley 99 keyed to a shaft 100. Also keyed to the shaft 100 there is a pinion 101 which meshes with a spur gear 102 keyed to shaft 103 of roll 97. Gear 102 also drives roll 96 through a spur gear 104 keyed to shaft 105 of roll 96.

In order to adjustably locate the said belt 95 the same is supported at each side of the machine by a set of three arms 106, 107 and 108, said arms having suitable slots therein as at 109 to accommodate clamping bolts as at 110. It will be understood that by reason of the drive mechanism, above described, the conveyor belt 95 will be operated continuously so as to feed the dough web to the constantly running finishing rolls 96 and 97.

Figure 12:
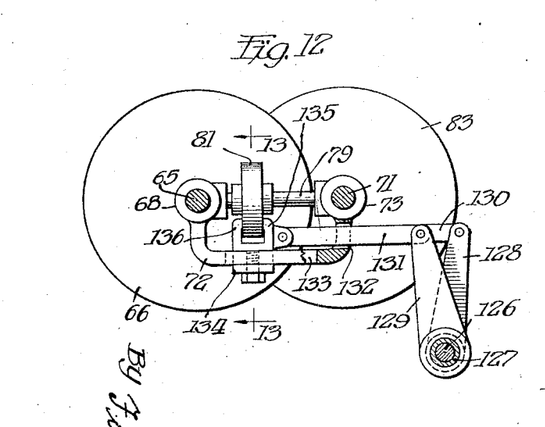
Fig. 12 is a section taken through the line 12—12 of Fig. 11.
Figure 13:
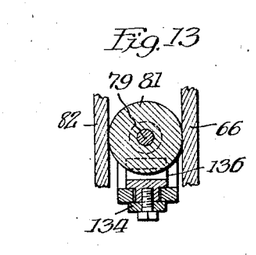
Fig. 13 is a section taken on the line 13—13 of Fig. 12.
Figure 14:
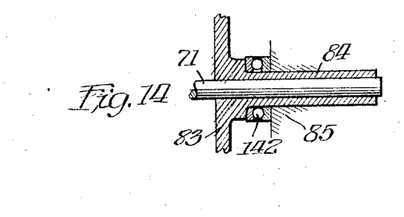
Fig. 14 is a section through one of the thrust collars.

If desired, the belts 98 and 50 may be driven from the same source of power such as an electric motor, preferably of the variable speed type. The speed of the conveyor belt 95 may be regulated independently of the speed of finishing rolls 96 and 97 and in accordance with the feed requirements of said rolls 96 and 97 by moving the friction pulley 80 along its supporting shaft 76. Similarly the speed of shaft 71 which controls the length of the intervals between intermittent operations of the rolling apparatus of the first stage, may be varied by shifting the friction pulley 81 longitudinally along its supporting shaft 79. Said shift of the pulleys 80 and 81 is effected by means of a pair of independently operable hand levers 111 and 112 which are mounted on pins 113 and 114 carried by a bracket 115 bolted to one side of the main frame of the machine. The levers 111 and 112 are capable of being locked in any desired position by means of suitable clamping nuts or screws as indicated at 116 and 117, which operate in conjunction with arcuate slots 118 and 119 formed in casting 115. The hand levers 111 and 112 are made with integral side lugs provided with pivot pins 120 and 121 which serve as connections for the upper ends of the downwardly extending links 122 and 123. The lower ends of said links 122 and 123 are respectively pivotally connected to the outer ends of a pair of arms 124 and 125 respectively keyed to the ends of a shaft 126 and the sleeve 127 (see Fig. 4) surrounding said shaft. Toward the opposite end of shaft 126 and on the inner end of sleeve 127, there are respectively keyed upstanding arms 128 and 129 to the upper ends of which there are connected two horizontally extending links 130 and 131. Said links 130 and 131 respectively control the positions of friction pulleys 80 and 81 by means similar in each case and hence only the mechanism employed to shift pulley 81 will be described. Referring to Fig. 12, it will be noted that the link 131 extends through a slot 132 in one of the short vertical limbs of connecting bar 72, the horizontal limb of which bar 72 is also slotted as indicated at 133 to accommodate the slide 134. The upper end of said slide is made with a fork or bifurcation, the upstanding arms 135 and 136 of which engage opposite sides of the friction pulley 81. It will be manifest that when the sleeve 127 is rocked on its axis by shifting hand lever 112, the link 131 will pull the slide 134 and shift the pulley 81 on shaft 79, thus changing the speed of shaft 71 with reference to the constantly running shaft 65. Similarly, movement of the hand lever 111 will shift link 130 and move friction pulley 80 along shaft 76 thus serving to vary the speed of the conveyor chain 95 with respect to the uniformly and continuously driven shaft 65.

In order to insure the necessary pressure for driving discs 83 and 82 from disc 66 by means of the friction pulleys 80 and 81, the disc 66 is permitted to slide on shaft 65 and disc 82 is permitted to slide on shaft 71. This allows of the insertion of a strong compression spring 137 between the hub 138 of said disc 82 and a collar 139 on shaft 71. The collar 139 is adjustably mounted on a supporting collar 140 fixed to and on shaft 71 by means of a set screw 141. Ball thrust bearings, as indicated for example at 142 in Figs. 11 and 14, may be suitably located in order to take the thrust of compression spring 137.

On the end of the constantly running interval timing shaft 71 there is keyed a sprocket pinion 143 whereon there is trained a drive chain 144, which drive chain passes around and drives a sprocket wheel 145 keyed to a stub shaft 146. There is also keyed on said stub shaft 146 a small spur pinion 147 which meshes with a spur gear 148 revolving on a stub shaft 149. To the side of said spur gear 148 there is secured a disc 150 on the periphery of which there is formed a cam or dog 151. As the dog 151 is revolved constantly by the above described train of mechanism, at each revolution of its travel, it engages a lug 152 carried at an intermediate point in the side of an upstanding lever 153, the lower end of which is pivoted on a fixed pin 154.

The upper end of said lever 153 is adapted to engage the tappet 155 of a bell crank 156, said tappet 155 being normally drawn toward the upper end of said lever 153 by means of a suitably coiled tension spring 157. The bell crank 156 is keyed to the end of a rock shaft 158 and hence serves to control an arm 159 also keyed to said shaft 158, but to the other end thereof, said arm 159 actuating the trip of the clutch connecting constantly running spur gear 56 with shaft 40.

On the end of shaft 40 adjacent the bell crank 156, there is keyed a spur gear 160 which meshes with a spur gear 161 revolving on shaft 162. On the side face of said spur gear 161 there is bolted a pair of cams 163 and 164, the former of which controls bell crank 156. At its end, as indicated in Fig. 8, the cam 163 is made with a depression 165 to accommodate the hook-shaped point 165$^a$ of the obliquely disposed arm 166 of said bell crank 156. The remaining portion of the track of the radial cam 163 is concentric with the axis of shaft 162 so that the bell crank will be maintained in its driving position so as to operate shaft 40 when said point 165$^a$ is riding on said concentric surface. When in said driving position the point 167 of the trip arm 159 is moved outwardly, i. e., away from the axis of shaft 40 so as to be out of the path of trip dog 168, as the latter revolves with shaft 40. However, when spur gear 161 has revolved the required number of revolutions, as predetermined by the ratio between the numbers of teeth on pinion 160 and spur gear 161, the point 165$^a$ will drop into notch 165, thus permitting bell crank 156 to rock shaft 158 into such position that the end 167 of arm 159 will engage dog 168 and disengage shaft 40 from gear 56, thus arresting further rotary movement of shaft 40. Said bell crank 156 is again rocked on its axis by the engagement of dog 152 by rotary cam 151.

The gear ratio of the train which drives the cam 151 is such that under ordinary circumstances with proper adjustment of hand lever 112 which controls the interval, the spur gear 161 will make a complete revolution and unclutch shaft 40 in a fraction of the time necessary for a complete revolution of cam 151. During the remainder of the revolution of cam 151 the shaft 40 remains quiescent and hence the entire apparatus, which serves to subject the dough to its first stage of treatment is suspended in operation.

*The piling mechanism.*

Figure 2:
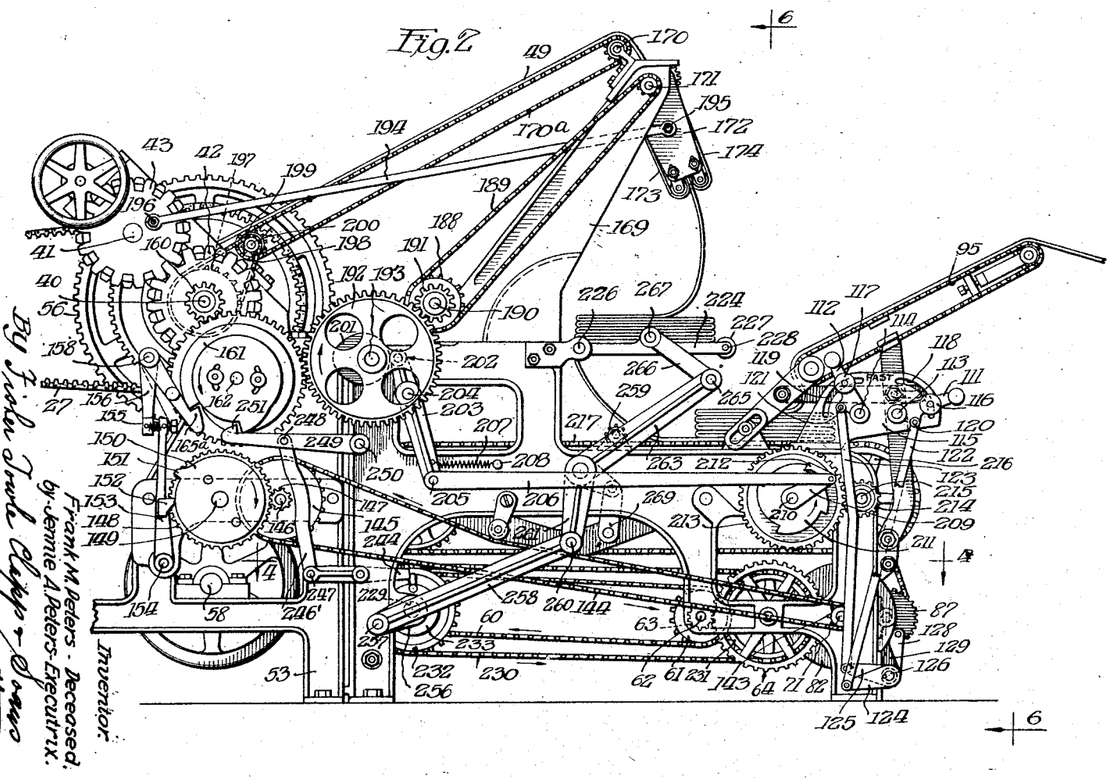
Fig. 2 is a similar side elevation of a portion of the apparatus.
Figure 3:
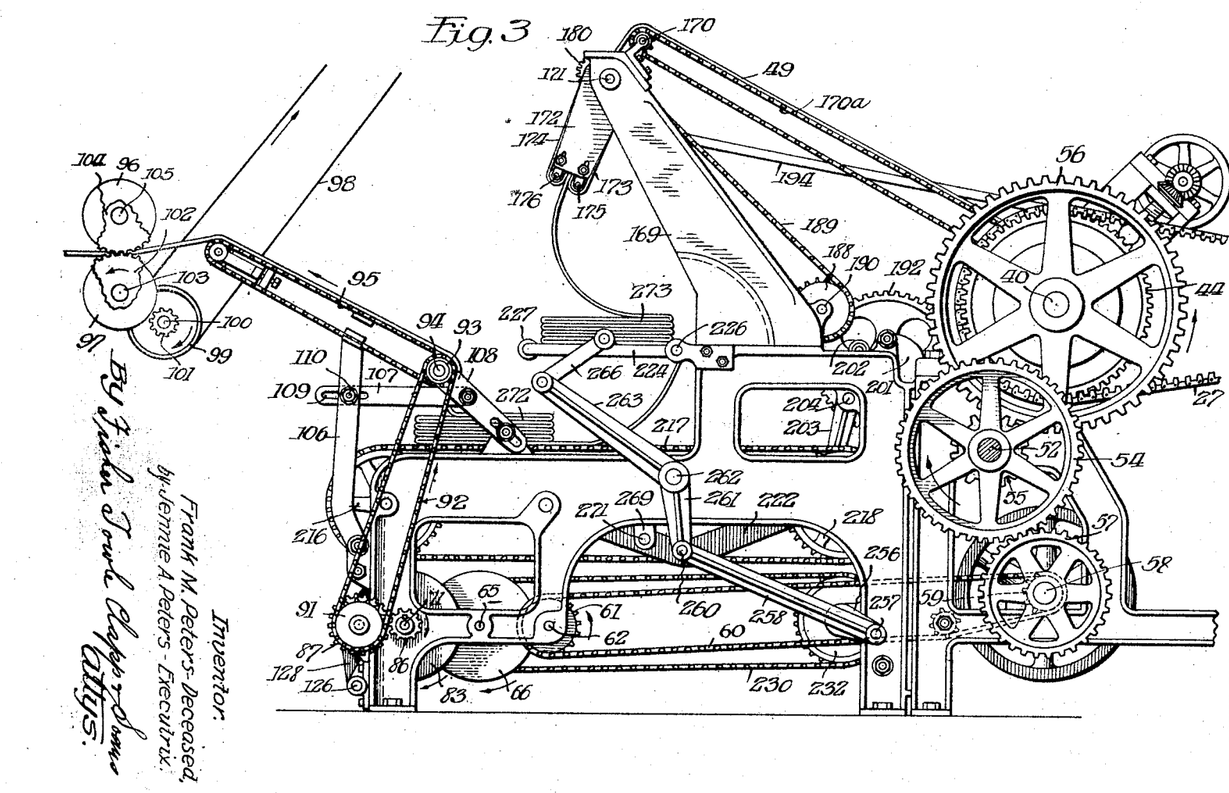
Fig. 3 is the reverse of Fig. 2.
Figure 7:
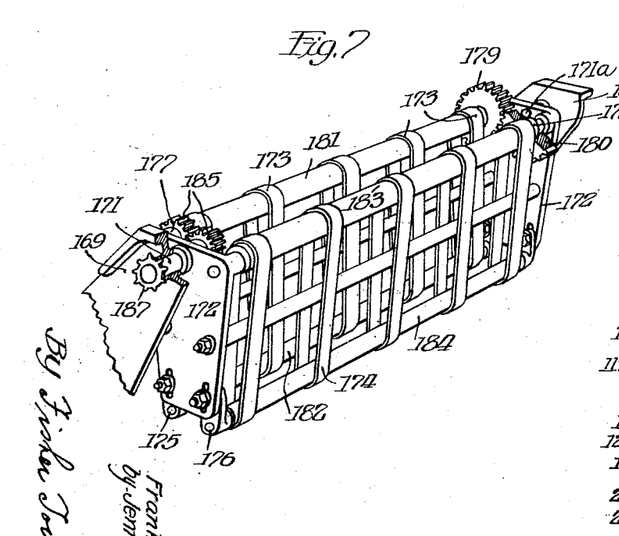
Fig. 7 is a perspective of the lapping mechanism.

Referring to Figs. 1, 2 and 3, at each side of the machine there are a pair of inclined upwardly extending brackets as at 169 in the upper ends of which there is journaled a shaft 170 around which conveyor 170$^a$ is trained and also a pair of short stub shafts as at 171 and 171$^a$. Said stub shafts 171 constitute bearings or pivots for the swinging frames 172 at each side of the machine, said frame serving to support the spaced distributing belts 173 and 174. Said distributing belts 173 and 174 are trained around rollers or shafts 175 and 176 (see Fig. 7) at the lower ends of the frame arms 172 and the upper ends of said belts 173 and 174 are trained around shafts 177 and 178. Shafts 177 and 178 are geared together by similar intermeshing spur gears 179 and 180 respectively keyed to said shafts 177 and 178. Preferably, in order to reduce friction and promote smoothness of operations, the belts 174 and 173 are trained around rollers 181, 182, 183 and 184 of considerably larger diameter than the shafts 177, 175, 178 and 176, by which said rollers are carried.

In order to effect positive traveling of the belts 173 and 174 in a direction of movement of the dough sheet 49 which is carried by conveyor 170$^a$, the shaft 171 is geared to shaft 177 by a pair of intermeshing bevel gears 185 and 186 respectively keyed to said shafts. The stub shaft 171 is also equipped with a sprocket wheel 187 which is driven from a sprocket wheel 188 by means of a chain 189. Sprocket wheel 188 is keyed on a shaft 190 on which there is also fixed a small spur gear 191 meshing directly with a spur gear 192 mounted on the stub shaft 193. The spur gear 192 serves as an intermediate gear for transferring to the spur gear 191 the rotary movement of gear 161 previously referred to and with which spur gear 192 directly meshes.

The distributing belts 173 and 174 are swung or rocked around the axis of shaft 171 by means of a connecting rod 194, one end of which is pivoted on a pin 195 fixed to the side of frame member 172, while the other end of said rod 194 is pivoted on a crank pin 196 secured in the side of the spur gear 43 on the upper roll shaft 41. The conveyor 170$^a$ is actuated from the lower secondary roll shaft 40 on which there is keyed a sprocket gear 197. The sprocket gear 197, by means of a chain 198 drives a sprocket pinion 199 keyed on the lower shaft 200 of the conveyor 170$^a$. It will be observed that all of the intermittently driven dough-sheeting and distributing mechanisms which include the primary roughing rolls 22, the secondary roughing rolls 42 and 43, the cross sheeting or W mechanism 29, conveyor 30, conveyor 31, conveyor 170ª means for rocking the distributing belts 173 and 174 and means for driving said last named belts, are all actuated continuously whenever the shaft 40 is clutched to the constantly rotating spur gear 56. Unless so clutched, all of the above parts are quiescent.

In addition to the intermittently driven primary sheeting distributing mechanism, for subjecting the dough to the first stage of the treatment, an important feature of my invention comprises the means for automatically taking care of the accumulations or piles of lapped dough produced by the relatively high speed operation of the intermittent primary sheeting mechansm. Also, on account of the fact that the periods of operation of the primary sheeting mechanism are preferably long enough to produce a considerable quantity of primary web 49 at each period of operation, in the present instance eight complete plys or folds of dough, it is desirable to provide special means for taking care of such accumulations so as to permit continuous delivery of the unbroken web to the finishing rolls 96 and 97. In this connection, it is found desirable to reverse each pile of web after its formation, so as to deliver to the conveyor 95, the forward end of the web. That is to say, that part of the web which is laid down at the bottom of each pile of web by the rocking distributing belts 173 and 174 should be the first to be presented to the conveyor 95. To further this end, it is found desirable to move forward each lapped pile of web after it is formed, thereby providing room for a succeeding pile in the event that the lapped or forward pile has not yet been completely used up or delivered to the conveyor belt 95. We will now describe such reversing and propelling mechanism.

Preferably, the mechanism for moving the piles successively forwardly toward the delivery belt 95 is operated during the period of activity of the primary sheeting mechanism and in the present instance is operated during the first portion of such period. To this end, I key to shaft 193, previously referred to, a rotary cam 201, the bracket of which cooperates with a cam roll 202 on the upper end of a lever 203 rocking on stationary pivot 204 (see Fig. 2). To the lower end of said lever 203 and by means of a pin 205 there is pivotally connected a ratchet operating bar or rod 206. Normally, the rod 206 is retracted, that is to say, moved toward the delivery end of the machine by means of a coiled tension spring 207 connected between the lower end of said lever 203 and a stationary pin or hook 208. Incidentally, said spring 207 serves to maintain cam roll 202 in engagement with the track of cam 201. The other end of said link 206 is pivotally connected to the outer end of a rock arm 209 journaled on a shaft 210. On the shaft 210 there is keyed a four-toothed ratchet 211 with which cooperates a pawl 212 pivotally carried by the outer end of arm 209. On shaft 210 there is also keyed a spur gear 213 which meshes directly with a spur pinion 214 keyed to shaft 215. On said shaft 215 there are keyed sprocket wheels 216 around which there is trained the conveyor belt 217. The other end of said conveyor belt 217 (see Fig. 5) is trained around similar sprocket wheels 218. The sprocket wheels 218 are carried on a shaft 219, the ends of which are journaled in rectangular bearing blocks 220 slidably mounted in the rectangularly slotted ends 221 of a pair of swingable arms 222 at the respective sides of the machine. Said arms 222 are keyed to a transverse rock shaft 223 which normally occupies such position that the conveyor belt 217 resumes a horizontal position as shown in full lines in Figs. 1, 2 and 3 and in dotted lines in Fig. 5. While in such horizontal position, the cam 201 moves the link 206 in such direction as to cause the ratchet wheel 211 to move a distance of one tooth. This causes a multiplied movement of shaft 215 and a correspondingly greater advance movement of the conveyor belt 217.

In order to permit of the reversing of the pile, I prefer not to deposit said pile directly upon the upper surface of the conveyor belt 217, but on the upper surface of a swinging table or shelf 224. Said swinging table 224 is fitted with suitable slats 225 which form the flat surface of said shelf or table, the frame of which, at one side thereof is pivoted on axially stationary stub shafts as at 226. The outer end of the swinging table 224, if desired, may be provided with a roller 227 rotatable on shaft 228.

The table 224 is rocked by one revolution of shaft 229 (see also Figs. 1, 9 and 10), which shaft 229 is energized toward the end of the period of activity of the primary sheeting mechanism. The power to drive said shaft 229 is derived from constantly running shaft 65 (see Fig. 4) by virtue of a chain 230 trained around a sprocket wheel 231 keyed to shaft 65 and also trained around a sprocket wheel 232, which runs continuously, but does not energize the shaft 229 until clutched thereto by the mechanism shown in Figs. 9, 10 and 10ᴬ. Said clutch mechanism is similar in construction to the clutch mechanism which serves to connect shaft 40 with constantly running spur gear 56, and will now be described.

Figures 9, 10, 10A:
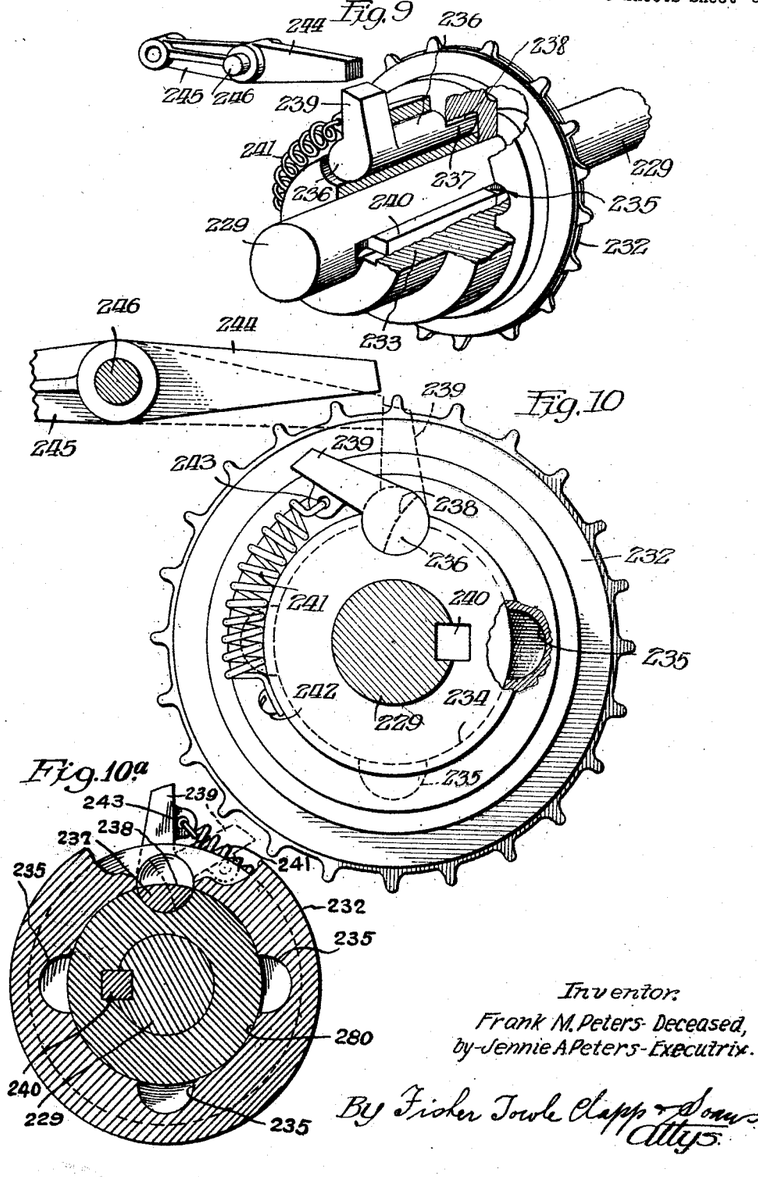
Fig. 9 is a perspective view of other clutch mechanism, certain parts being broken away in order to clarify the showing.
Fig. 10 is an end elevation of the clutch mechanism shown in Fig. 9, Fig. 10ᴬ is a cross sectional view of the clutch mechanism of Figs. 9 and 10, taken through the overlapping parts of the two clutch elements.
Figure 11:
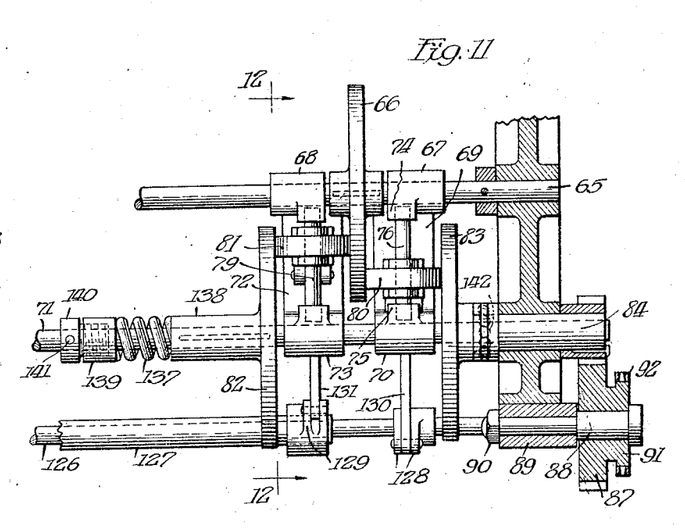
Fig. 11 is a fragmentary enlargement of a portion of Fig. 4, partly in section.

Referring to said Figs. 9, 10 and 10^A, the constantly running element, in the present instance the sprocket wheel 232, is mounted to turn freely on the shaft 229 and has a circular seat or recess 280 at one side loosely receiving the end 234 of the male clutch member 233. The interior of said seat or recess 280 in member 232 is further machined out at intervals therearound to provide a series, in this case four, hemispherical cavities or notches 235, the radius of which is the same as that of the clutch pin 236. Said clutch pin 236 is as to its operative end 237 milled off as shown at 238 in Figs. 10 and 10^A, the portion remaining after such milling operation being of such shape that when the said pin 236 is in the normal position the surface of said end portion 237 forms a continuation of the circumference of the hub portion 234 of the main element by which said pin 236 is carried. The body of said clutch pin 236 is rockingly supported in an aperture drilled in the male clutch member 233 parallel with the axis of shaft 229 and at its outer end is made with an integral dog or lug 239, the male member 233 being rigidly secured to shaft 229 by a key 240. The dog 239 is normally held in the position shown in Figs. 9 and 10^A by engagement of the end thereof with the end of a trip arm 244 in which position no part of the end 237 of the clutch pin 236 projects beyond the periphery of the portion 234 of the hub 233 and the clutch 232 is therefore free to turn without affecting the male clutch member 233 or the shaft 229. A coiled tension spring 241 connected between a screw or pin 242 set in the circumference of male member 233 and the perforated lug 243 on the side of dog 239, exerts a tension to rock the clutch pin 236 and swing the dog 239 to the position shown in full lines in Fig. 10 when said dog is released from the trip arm 244. Such movement however, is not permitted until one of the recesses 235 reaches the location of the clutch pin end 237 as the engagement of the inner surface of the recess 280 with the outer curved surface of the end 237 of the clutch pin prevents turning of the clutch pin after release of the dog 239 until one of the cavities 235 is in position to admit the end 237 of the clutch pin. A number of these cavities 235 are provided so as to insure prompt engagement of the clutch mechanism immediately upon release of the dog 239, and when said dog is released and one of the recesses 235 comes to a position opposite the clutch pin end 237, the spring 241 rocks the clutch pin, turning the mutilated end 237 of the clutch pin to the position as indicated by dotted line in Fig. 10^A so that the clutch member 232 is interlocked with the clutch member 233, and the shaft 229 thus rotated until the dog 239 again engages the trip arm 244 and is moved so as to release the clutch connection.

The rocking of trip lever 245 into its dotted line or clutching position, as shown in Fig. 10, is effected by means of a link 246' (see Fig. 2), the lower end of which is connected to a pin 247 on the end of trip lever 245. The upper end of said link 246' is pivotally connected to a pin 248 fixed in the side of and intermediate the length of a cam finger 249, one end of which is pivotally mounted on a stationary pin 250, while the other end thereof is provided with a cam hook 251 cooperating with the cam 164, previously referred to, (see Fig. 8). It will be observed that the cam plate 164, by means of clamping bolts 252 and arcuate slots 253 is adjustable with reference to cam 163 and gear 161 and is so located that the horn or operating projection 254 engages and raises cam point 251 and so unlatches the clutch pin 239 slightly before the point 165^a or bell crank 156 drops into notch 165 and arrests the movement of gear 161 by disengaging clutch pin dog 168 which controls connection between shaft 50 and constantly running spur gear 56.

Figure 5:
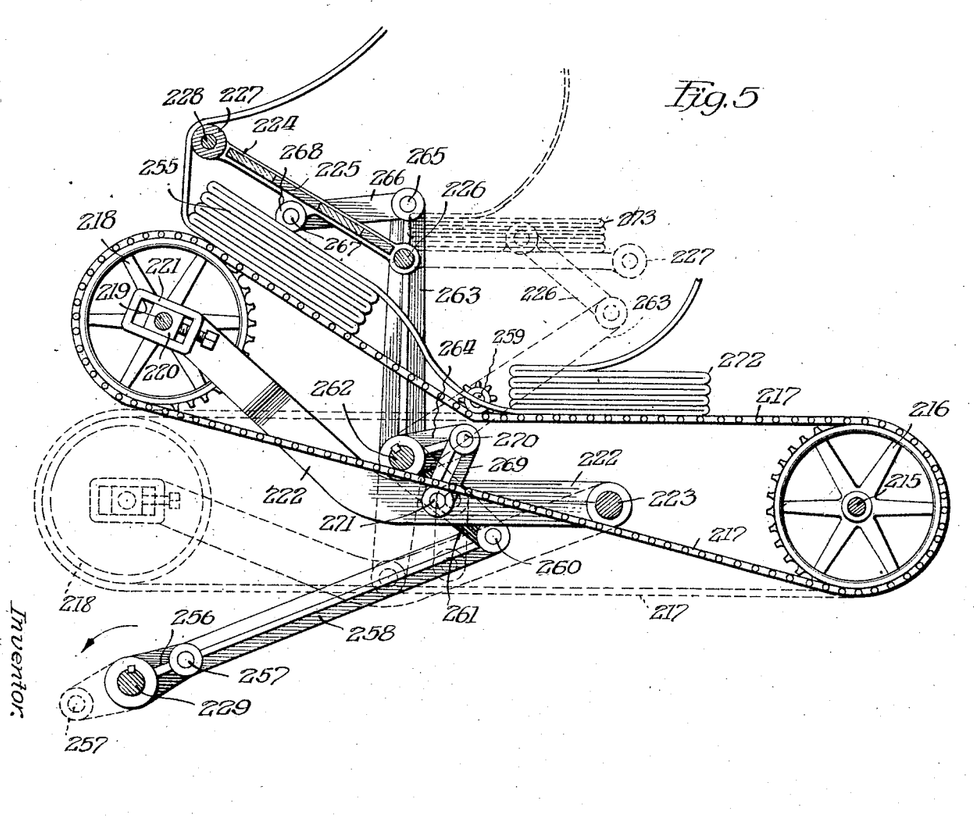
Fig. 5 is an enlargement of a portion of Fig. 2 showing certain parts in different positions.
Figure 6:
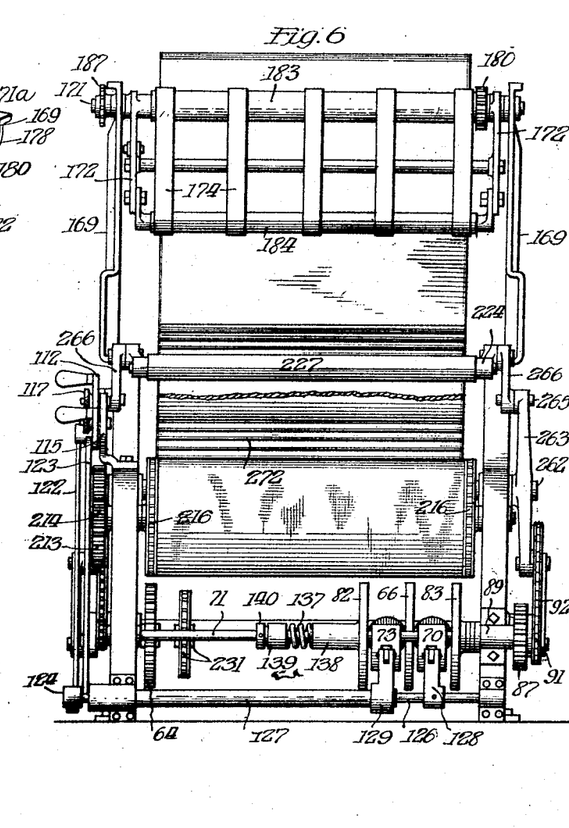
Fig. 6 is an end view of the apparatus shown in Fig. 2.

When a single revolution is thus imparted to shaft 229 toward the end of a period of activity of the primary sheeting mechanism, the table 224 is dumped and the rear end of the belt 217 is swung up or elevated, as shown in full lines in Fig. 5 to meet the falling and reversed pile of dough 255. This result is effected by means of a crank arm 256 keyed to shaft 229 carrying a pin 257 forming a pivotal connection for the end of a connecting rod 258. The other end of said connecting rod 258 is pivotally connected at 260 to the outer end of an arm 261 which is keyed to shaft 262, to which shaft 262 there are also keyed long arms 263 and short arms 264. The long arms 263 are at their outer ends 265 pivotally connected to links 266. The other ends of said links 266 are connected to pivot pins 267 mounted in lugs 268 on platform 224.

The short arms 264 on the rock shafts 262 serve to lift the conveyor into the full line position as indicated in Fig. 5 through the medium of links 269, the ends of which are respectively pivoted to pins 270 on arms 264 and pins 271 in the sides of rock arms 222 in the outer ends of which the conveyor shaft 219 is mounted. A pair of small idler sprockets, as at 259 serve to prevent slackness developing in the upper stretch of conveyor belt 217 when the latter is swung into its full line position as shown in Fig. 5.

In view of the above description, the operation of the combined machine may be summarized as follows. Those parts of the mechanism which are operated continuously include the finishing rolls 96, 97 and the conveyor 95, which feeds the finishing rolls.

The speed of the conveyor 95 is regulated according to the requirements of the finishing rolls 96 and 97 by adjusting hand lever 111 which controls the position of friction pulley 80 interposed between constantly running discs 66 and 83. The web of dough is delivered to the lower end of conveyor 95 from the top of the pile which pile has been moved into the position shown in the figures by the intermittently operated conveyor belt 217, said pile 272 also being in a position the reverse of that which is occupied by the pile 273.

The timing shaft 149 is also operated continuously, making one revolution for each cycle of operations of the intermittent portion of the apparatus. The speed at which said shaft 149 is driven, such speed being regulated by hand lever 112, controls the length of the cycle. It does not, however, control the speed of operation of any portion of the intermittent apparatus, since such apparatus is all driven by a constant speed continuously operating power belt 50 through positive gearing. The speed at which said shaft 149 revolves merely determines the length of interval between periods of activity of the intermittent operating mechanism. The shaft 149 controls the starting of the intermittent mechanism by cam 151, dog 152, lever 153, arm 156, rock shaft 158, trip arm 159 and dog 168 which controls the connection between shaft 40 and spur gear 56. After arm 159 has been tripped, cam 163, which in the present instance, revolves one-fourth of the speed of shaft 40, holds trip arm 159 out of path of dog 168 and permits shaft 40 to revolve four times before notch 165 of cam 163 permits shaft 158 to rock back into the position where trip arm 159 will throw out the clutch.

As previously stated, shaft 40 operates the primary sheeting mechanism. Just before point 165ª drops into notch 165 of cam 163 and permits drop arm 159 to assist the movement of the primary sheeting mechanism, horn 254 depresses trip lever 245 and clutches shaft 229 to the constantly running sprocket 232. It will be understood that before the shaft 229 has made a complete revolution, horn 254 has snapped past point 251 permitting same to drop back into its normal position so that lever 245 will be in position to disengage the clutch by the time the shaft 229 has made its complete revolution. Ordinarily, the cams 163 and 164 will be suitably shaped and adjusted so that the shaft 229 will commence to revolve before the stoppage of shaft 40. This insures that the distribution of web 40 of pile 273 in the proper number of lapped folds has been substantially completed before the commencement of movement of reversing platform 224. When shaft 229 starts to revolve, the movement of crank arm 256 will swing the table 224 and conveyor element 217 into the full line position shown in Fig. 5, thus dumping the completed pile 255 in reversed position on the rear surface of conveyor 217. As soon as crank pin 257 comes around to its original position as indicated in dotted lines in Fig. 5, the conveyor 217 drops back into horizontal position and the platform 225 is swung back into its normal or dotted line position ready to receive another pile or accumulation of primary sheeted dough whenever the intermittent primary sheeting mechanism is again thrown into operation. The conveyor 217 does not advance toward the conveyor 95 until during the first half of the next period of activity of the primary dough-sheeting mechanism, by reason of the rotation of cam 201 and ratchet wheel 211.

The details of construction and operation are merely illustrative of a single phase of the invention, the scope of which should be determined by reference to the appended claims, said claims being construed as broadly as possible, consistent with the state of the art.

I claim as my invention:

1. The method of continuously sheeting dough which consists in rolling out a dough portion in the form of a relatively thick web and accumulating a store of the web so formed, suspending the rolling of said dough portion and continuously propelling and rolling the forward end of the web to reduce its thickness, while maintaining continuity of the web and its connection with the batch during the period of suspension.

2. The method of continuously sheeting dough which consists in comparatively rapidly rolling out a portion of a batch of dough to form a relatively thick web and so accumulating a store of the web so formed, suspending the rolling, continuously propelling and rolling the forward end of the said web to reduce its thickness, while maintaining continuity of the web and its connection with said batch, while drawing from the store during the suspension period and resuming the rolling of the batch before the store of accumulated web has become exhausted.

3. The method of continuously sheeting dough which consists in comparatively rapidly rolling out a portion of a batch of dough to form a relatively thick web and so accumulating a store of the web so formed, suspending the rolling, continuously propelling and rolling the forward end of the said web to reduce its thickness, while maintaining continuity of the web and its connection with said batch, while drawing from the store during the suspension period and resuming the rolling of the batch before the store of accumulated web has become exhausted to form a new store or accumulation of web independent from the first store.

4. The method of rolling dough which consists in forming from a relatively large batch of dough, a plurality of successive connected accumulations of web, further rolling the forward end of the web, the initial rolling of the accumulations being suspended intermediate the accumulating of the accumulations and the succeeding accumulation in each case being completed before the preceding accumulation has become exhausted.

5. The method of sheeting dough which consists in forming a succession of connected, separately located piles of sheet dough, rolling out the forward end of the forward pile as a continuous process and moving the piles forward successively to make room for the next succeeding pile, when formed.

6. The method of sheeting dough which consists in forming a succession of connected, separately located piles of sheet dough, rolling out the forward end of the forward pile as a continuous process and moving the piles forward successively to make room for the next succeeding pile, when formed, and reversing each pile prior to drawing the web therefrom.

7. The method of sheeting dough which consists in intermittently forming from a single batch of dough successive, lapped piles of dough, successively reversing each of said piles in order to permit drawing of the web from the top of the pile while maintaining connection between successive piles and further rolling the forward end of said web as a continuous process.

8. The method of sheeting dough which consists in intermittently forming from a single batch of dough successive, lapped piles of dough, successively reversing each of said piles in order to permit drawing of the web from the top of the pile while maintaining connection between successive piles, advancing each pile after the formation thereof to make room for the next succeeding pile, and further rolling the forward end of said web as a continuous process.

9. In combination, means for continuously propelling a continuous length of sheet dough, intermittently operating dough-sheeting mechanism for delivering to the propelling means a continuous length of sheet dough, and adapted, when operated to run at a considerably higher speed than the continuous propelling means, and means interposed between the intermittent sheeting mechanism and the continuous propelling mechanism for storing the excess output of the sheeting mechanism intermediate operations of the latter.

10. In combination, means for continuously propelling a continuous length of sheet dough, intermittently operating dough-sheeting mechanism for delivering to the propelling means a continuous length of sheet dough, and adapted, when operated, to run at a considerably higher speed than the continuous propelling means, and means interposed between the intermittent sheeting mechanism and the continuous propelling mechanism for storing the next output of the sheeting mechanism intermediate operations of the latter, while maintaining the continuity of the web.

11. In combination, means for continuously propelling a continuous length of sheet dough, intermittently operating dough-sheeting mechanism for delivering to the propelling means a continuous length of sheet dough, and adapted, when operated, to run at a considerably higher speed than the continuous propelling means, and means interposed between the intermittent sheeting mechanism and the continuous propelling mechanism intermediate operations of the latter, while maintaining the continuity of the web, and for delivering said excess, during the period of operation of the sheeting mechanism, to the propelling mechanism, whereby the propelling mechanism is continuously supplied with a continuous web.

12. In combination, means for rolling a web from a batch of dough at relative high speed so as to form a continuous web, means for arresting the operation of such rolling means during successive intervals, means for rolling the end of said web so formed and means for accumulating a store of such web intermediate operations of the rolling means and for delivering a portion of said store to said second rolling means during periods of rest of said first rolling means whereby said second rolling means may be maintained continuously in operation.

13. In combination, means for rolling a web from a batch of dough at relative high speed so as to form a continuous web, means for arresting the operation of such rolling means during successive intervals, means for rolling the end of said web so formed and means for accumulating a store of such web intermediate operations of the rolling means and for delivering a portion of said store to said second rolling means during periods of rest of said first rolling means whereby said second rolling means may be maintained continuously in operation, the arrangement including means for maintaining successive stores of web connected to each other.

14. In combination, means for rolling a web from a batch of dough at relative high speed so as to form a continuous web, means for arresting the operation of such rolling means during successive intervals, means for rolling the end of said web so formed and means for accumulating a store of such web intermediate operations of the rolling means and for delivering a portion of said store to said second rolling means during periods of rest of said first rolling means whereby said second rolling means may be maintained continuously in operation, the arrangement including means for maintaining successive stores of web connected to each other and means for changing the positions of said accumulations to facilitate feeding of the web from the top of each accumulation.

15. In combination, intermittently operating dough-rolling mechanism adapted to deliver a continuous web of dough and deposit same in a lapped pile and means for changing the position of said pile to permit delivery of the forward end of the web from the top of the pile.

16. In combination, intermittently operating dough-rolling mechanism adapted to deliver a continuous web of dough and deposit same in a lapped pile and means for changing the position of said pile to permit delivery of the forward end of the web from the top of the pile, while maintaining continuity between the pile and the forward and rearwardly extending web.

17. In combination, intermittently operating dough-rolling mechanism adapted to deliver a web of dough, means for depositing said web as formed in a lapped pile and means for reversing the position of said pile to permit feeding the forward end of said web from the top of said pile rather than the bottom thereof, while maintaining continuity of the web.

18. In combination, intermittently operating dough-rolling mechanism adapted to deliver a web of dough, means for depositing said web as formed in a lapped pile and means for reversing the position of said pile to permit feeding the forward end of said web from the top of said pile rather than the bottom thereof, while maintaining continuity of the web, the arrangement including means for advancing each pile to make way for the deposition of the succeeding pile.

19. In combination, means for continuously propelling a continuous length of sheet dough, intermittently operating dough-sheeting mechanism for delivering to the propelling means a continuous length of sheet dough, and adapted, when operated to run at a considerably higher speed than the continuous propelling means, means interposed between the intermittent sheeting mechanism and the continuous propelling mechanism for storing the excess output of the sheeting mechanism intermediate operations of the latter, and means for regulating the interval between operation of the intermittent dough-sheeting mechanism independently of the speed of the continuous propelling mechanism.

20. In combination, means for continuously propelling a continuous length of sheet dough, intermittently operating dough-sheeting mechanism for delivering to the propelling means a continuous length of sheet dough, and adapted, when operated, to run at a considerably higher speed than the continuous propelling means, and means interposed between the intermittent sheeting mechanism and the continuous propelling mechanism intermediate operations of the latter, while maintaining the continuity of the web, and for delivering said excess, during the period of operation of the sheeting mechanism, to the propelling mechanism, whereby the propelling mechanism is continuously supplied with a continuous web and means for regulating the interval between operations of the intermittent dough-sheeting mechanism independently of the speed of the continuous propelling mechanism.

JENNIE A. PETERS,
*Executrix of the Estate of Frank M. Peters, deceased.*